(12) United States Patent
Brox et al.

(10) Patent No.: US 10,075,559 B1
(45) Date of Patent: Sep. 11, 2018

(54) SERVER CONFIGURATION MANAGEMENT SYSTEM AND METHODS

(71) Applicant: Sprint Communications Company L.P., Overland Park, KS (US)

(72) Inventors: David Brox, Olathe, KS (US); Christopher Smith, Olathe, KS (US); Donald B. Roth, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 137 days.

(21) Appl. No.: 15/286,531

(22) Filed: Oct. 5, 2016

(51) Int. Cl.
*H04L 29/08* (2006.01)
*H04L 29/06* (2006.01)
*G06F 21/57* (2013.01)

(52) U.S. Cl.
CPC ............ *H04L 67/34* (2013.01); *G06F 21/577* (2013.01); *H04L 63/1433* (2013.01); *H04L 67/10* (2013.01); *H04L 67/42* (2013.01)

(58) Field of Classification Search
CPC .......................... H04L 63/1433; G06F 21/577
See application file for complete search history.

(56) References Cited

U.S. PATENT DOCUMENTS

| | | | | |
|---|---|---|---|---|
| 8,561,175 | B2 * | 10/2013 | Williams | H04L 41/0853 713/177 |
| 9,250,884 | B2 * | 2/2016 | Ravi | G06F 9/44505 |
| 2004/0111643 | A1 * | 6/2004 | Farmer | G06F 21/604 726/1 |
| 2005/0216957 | A1 * | 9/2005 | Banzhof | H04L 63/02 726/25 |
| 2005/0257267 | A1 * | 11/2005 | Williams | H04L 63/0227 726/25 |
| 2006/0101517 | A1 * | 5/2006 | Banzhof | G06F 21/577 726/25 |
| 2007/0088706 | A1 * | 4/2007 | Goff | G06F 17/30445 |
| 2007/0250595 | A1 * | 10/2007 | Landfield | H04L 63/1441 709/218 |
| 2008/0270198 | A1 * | 10/2008 | Graves | G06Q 10/06 705/7.12 |
| 2010/0071066 | A1 * | 3/2010 | Kline | G06F 8/60 726/25 |
| 2011/0004917 | A1 * | 1/2011 | Saisa | H04L 63/1425 726/1 |

(Continued)

*Primary Examiner* — Lashonda T Jacobs (57) ABSTRACT

A server configuration management system is disclosed. The system comprises a script database storing a plurality of audit policies, a plurality of servers that each comprises an agent that executes at least a portion of one of the plurality of audit policies, and a configuration management server communicatively coupled to the script database and each agent. The configuration management server sends an audit script to a plurality of agents executing on a plurality of non-production servers of a common device group in a non-production environment, receives audit results from the plurality of agents, sends a remediate script to corresponding agents executing on non-compliant non-production servers, and responsive to a non-production server malfunctioning as a result of execution of the remediate script, creates, via a user interface, and implements an exception for a production server in the common device group in a production environment that corresponds to the non-production server.

20 Claims, 4 Drawing Sheets

(56) References Cited

U.S. PATENT DOCUMENTS

| | | | |
|---|---|---|---|
| 2011/0126111 A1* | 5/2011 | Gill | G06F 21/55 |
| | | | 715/736 |
| 2012/0304300 A1* | 11/2012 | LaBumbard | G06F 21/577 |
| | | | 726/25 |
| 2013/0204821 A1* | 8/2013 | Keith, Jr. | G06N 5/04 |
| | | | 706/46 |
| 2013/0339776 A1* | 12/2013 | Jagadishprasad | G06F 9/5094 |
| | | | 713/340 |
| 2015/0067342 A1* | 3/2015 | Pazdziora | H04L 9/3247 |
| | | | 713/176 |
| 2015/0332011 A1* | 11/2015 | Ting | G06F 19/3418 |
| | | | 705/2 |
| 2017/0024408 A1* | 1/2017 | Foley | H04L 63/1408 |
| 2017/0257379 A1* | 9/2017 | Weintraub | H04L 63/205 |

* cited by examiner

SERVER CONFIGURATION MANAGEMENT SYSTEM AND METHODS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An enterprise may be responsible for hundreds or even thousands of servers. As cyber threats develop and vulnerabilities change, configuration changes may need to be made to the servers to maintain security, compliance with industry computer standards, and/or consistency among the servers.

SUMMARY

In an embodiment, a server configuration management system is disclosed. The server configuration management system comprises a script database storing a plurality of audit policies for a plurality of device groups. The plurality of audit policies comprises a plurality of audit scripts, a plurality of remediate scripts, and lists of target servers. The server configuration management system also comprises a plurality of servers. Each of the plurality of servers is associated with one of the plurality of device groups and comprises an agent that executes at least a portion of one of the plurality of audit policies corresponding to the one of the plurality of device groups. The server configuration management system additionally comprises a configuration management server communicatively coupled to the script database and the agent on each of the plurality of servers. The configuration management server comprises at least one non-transitory memory, at least one processor, and one or more components stored in the at least one non-transitory memory, that when executed by the at least one processor send an audit script of an audit policy from the script database to a plurality of agents executing on a plurality of non-production servers of a common device group in a non-production environment based on a list of target servers in the audit policy. The audit policy is for the common device group of the plurality of device groups. The configuration management server also receives audit results of the execution of the audit script from the plurality of agents executing on the plurality of non-production servers that identify at least some of the plurality of non-production servers of the common device group as being non-compliant non-production servers in need of remediation, sends a remediate script of the audit policy from the script database to corresponding agents executing on the non-compliant non-production servers, and receives remediate results of the execution of the remediate script from the corresponding agents executing on the non-compliant non-production servers. Responsive to a non-production server of the non-compliant non-production servers malfunctioning as a result of execution of the remediate script, the configuration management server creates, via a user interface, and implements an exception for a production server in the common device group in a production environment that corresponds to the non-production server of the common device group in the non-production environment. An agent on the exception production server executes a modified audit policy based on the exception such that the agent on the exception production server does not apply at least a portion of the remediate script to the exception production server.

In an embodiment, a server configuration management method is disclosed. The server configuration management method comprises sending, by a configuration management server communicatively coupled to a script database, an audit script of an audit policy from the script database to a plurality of agents executing on a plurality of non-production servers of a common device group in a non-production environment based on a list of target servers in the audit policy. The audit policy is for the common device group of the plurality of device groups. The server configuration management method additionally comprises executing, by each of the plurality of agents, the audit script without user interaction, receiving, by the configuration management server, audit results of the execution of the audit script from the plurality of agents executing on the plurality of non-production servers that identify at least some of the plurality of non-production servers of the common device group as being non-compliant non-production servers in need of remediation, sending, by the configuration management server, a remediate script of the audit policy from the script database to corresponding agents executing on the non-compliant non-production servers, and executing, by each of the corresponding agents, the remediate script without user interaction. The server configuration management method further comprises receiving, by the configuration management server, remediate results of the execution of the remediate script from the corresponding agents executing on the non-compliant non-production servers, and responsive to a non-production server of the non-compliant non-production servers malfunctioning as a result of execution of the remediate script, creating, via a user interface associated with the configuration management server, and implementing, by the configuration management server, an exception for a production server in the common device group in a production environment that corresponds to the non-production server of the common device group in the non-production environment. An agent on the exception production server executes a modified audit policy based on the exception such that the agent on the exception production server does not apply at least a portion of the remediate script to the exception production server.

In an embodiment, a server configuration management method is disclosed. The server configuration management method comprises sending, by a configuration management server communicatively coupled to a script database, an audit script of an audit policy from the script database to a plurality of agents executing on a plurality of servers of a common device group based on a list of target servers in the audit policy. The audit policy is for the common device group of the plurality of device groups. The server configuration management method also comprises executing, by each of the plurality of agents, the audit script, and receiving, by the configuration management server, audit results of the execution of the audit script from the plurality of agents that identify at least some of the plurality of servers of the common device group as being non-compliant servers in need of remediation. The server configuration management method additionally comprises sending, by the configuration management server, a remediate script of the audit policy from the script database to corresponding agents executing on the non-compliant servers, and executing, by each of the corresponding agents, the remediate script without user interaction to remediate the non-compliant servers. Executing the remediate script without user interaction comprises executing a stop script to stop an application on the non-compliant servers, rebooting the non-compliant servers, and executing a start script to start the application on the non-compliant servers. The server configuration management method further comprises receiving, by the configuration management server, remediate results of the execution of the remediate script from the corresponding agents executing on the non-compliant servers.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Traditionally, server audits and remediation were done manually on just a subset of enterprise servers. As the number of servers maintained by an enterprise grows, maintaining security, compliance with industry computer standards (e.g., Sarbanes-Oxley (SOX) compliance, payment card industry (PCI) compliance, etc.), and/or consistency among the enterprise servers becomes more challenging especially as quickly as cyber threats develop and vulnerabilities change. Thus, the pending application is directed to an automated server configuration management system and methods that are more robust and efficient at managing server configurations.

The automated server configuration management system and methods described herein also help to address challenges of handling automated remediation. For example, having an automated process that might install a bad or otherwise less than ideal patch or configuration change across the network in automated fashion could result in a cascade of failures. By having the automated server management system identity related groups and relative statuses of servers in those groups (e.g., development, test, production, etc.) and schedule a sequence of automated installations with the ability to notify and selectively modify future scripts if a problem is detected with one of the scripts, enables a more confident and thorough automation system and process with less risk of accidental and/or unintentional disruption.

The server configuration management system may comprise a plurality of servers. In an embodiment, the plurality of servers includes non-production servers in a non-production environment and production servers in a production environment. The non-production environment includes development and test servers. In an embodiment, the non-production environment is where software and other products are developed and tested before being placed into the production environment. In contrast, the production environment may be where software and other products are actually put into operation for their intended uses by end users after being developed and tested in the non-production environment.

In an embodiment, servers are grouped together into device groups based on one or more common attributes. For example, servers with a common operating system platform may be grouped together into a device group. Each of the servers may include a configuration management agent to automatically execute scripts locally on the server without user interaction.

The server configuration management system may additionally include a script database and a configuration management server communicatively coupled to each of the agents on the plurality of servers and the script database. In an embodiment, the script database stores a plurality of audit policies comprising a plurality of audit scripts, a plurality of remediate scripts, and lists of target servers. A target server may be a server that is to be commanded to run an audit script and possibly a remediate script if deemed to be non-compliant. Each audit policy may correspond to one of the device groups. The audit policies may be created and/or updated based on one or more vulnerability scans. In an embodiment, the one or more vulnerability scans utilize a comprehensive vulnerability scanner to identify security vulnerabilities of servers in an enterprise network based on a database of known flaws.

The configuration management server may apply the audit policies to non-production servers in the non-production environment for a predetermined amount of time before such audit policies are applied to production servers in the production environment to try to minimize audit policy problems in the production environment. For example, in an embodiment, the configuration management server sends an audit script of an audit policy from the script database to a plurality of agents executing on a plurality of non-production servers of a common device group in a non-production environment based on a list of target servers in the audit policy and each of the plurality of agents automatically executes the audit script locally on the server without user interaction. The configuration management server may receive the audit results of the execution of the audit script from the plurality of agents executing on the plurality of non-production servers that identify at least some of the plurality of non-production servers of the common device group as being non-compliant non-production servers in need of remediation.

In a non-limiting example of non-compliance, a security vulnerability in an operating system may be identified and a patch may be developed to close or remove the vulnerability by the operating system vendor. If the enterprise has not yet installed the patch to a server, the server may be deemed non-complaint since the server remains exposed to the vulnerability. In another non-limiting example of non-compliance, a new PCI policy may mandate installation of a remote auditing agent. If the enterprise has yet to install the remote auditing agent on a server, the server may be deemed to be non-compliant. In a last non-limiting example of non-compliance, a server may be deemed non-compliant if the server has an incorrect port configuration making the server vulnerable to a denial of service attack. One of ordinary skill in the art would recognize that there are other types of non-compliance that could affect servers within an enterprise without departing from the spirit or scope of the present disclosure.

In an embodiment, in order to fix the non-compliance, the configuration management server sends a remediate script of the audit policy from the script database to corresponding agents executing on the non-compliant non-production servers, and each of the corresponding agents automatically executes the remediate script locally on the server without user interaction. Execution of the remediate script by a corresponding agent may automatically enable or disable a service on a non-compliant server, automatically change a system configuration setting of the non-compliant server, automatically install a patch, and/or automatically update a version of software on the non-compliant server. In some embodiments, execution of the remediate script by the corresponding agent may initiate a reboot. In such embodiments, in order to ensure a graceful shutdown/startup such that a load balancer recognizes when the server and any corresponding applications are present and able to receive traffic, executing the remediate script includes executing a stop script to stop an application on the non-compliant server, rebooting the non-compliant server, and executing a start script to start the application on the non-compliant server. Execution of the remediate script by each of the non-compliant servers of the common device group may maintain security, compliance with industry computer standards (e.g., SOX compliance, PCI compliance, etc.), and/or consistency among all of the servers of the common device group.

The configuration management server may receive remediate results of the execution of the remediate script from the corresponding agents executing on the non-compliant non-production servers. In an embodiment, responsive to a non-production server of the non-compliant non-production servers malfunctioning as a result of execution of the remediate script, the configuration management server creates, via a user interface, and implements an exception for a production server in the common device group in a production environment that corresponds to the non-production server of the common device group in the non-production environment. After a predetermined amount of time, the configuration management server may send the audit script to a plurality of agents executing on a plurality of production servers of the common device group in the production environment based on a list of target servers in a production audit policy. However, in an embodiment, an agent on the exception production server executes a modified audit policy based on the exception such that the agent on the exception production server does not apply at least a portion of the remediate script to the exception production server, thereby minimizing audit policy issues in the production environment and helping to ensure that the exception production server will continue normal functioning in the production environment.

Figure 1:
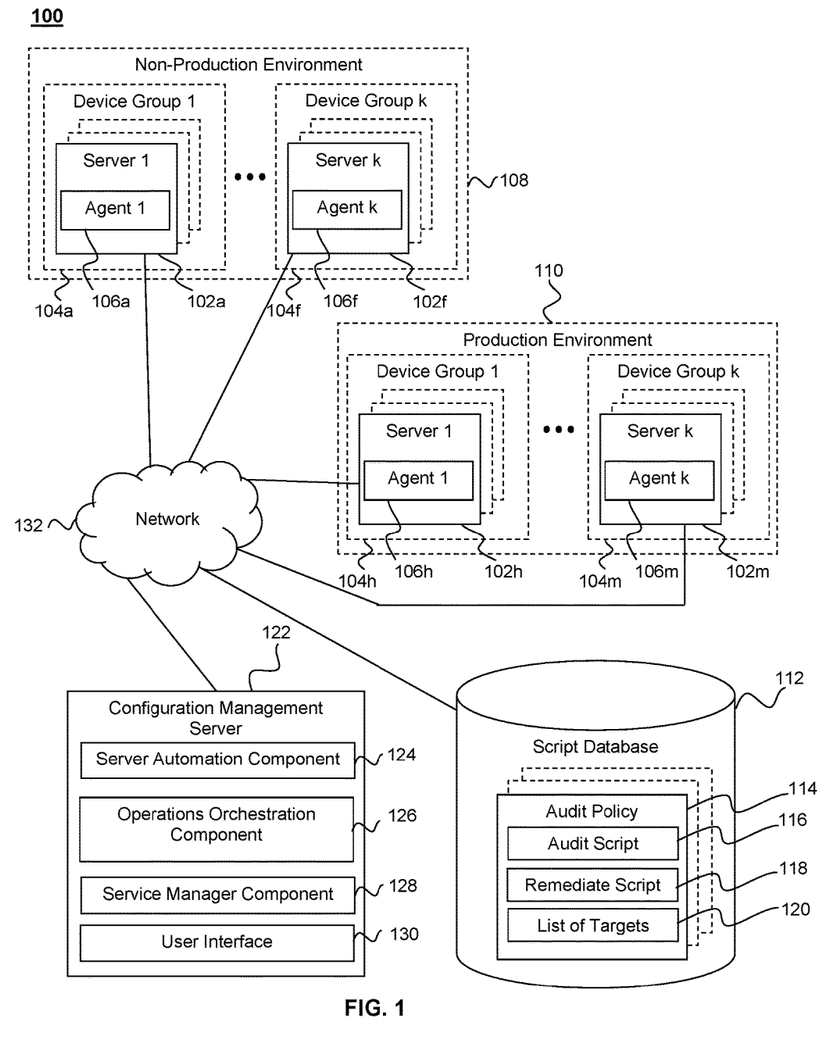
FIG. 1 is a block diagram of a system according to an embodiment of the disclosure.

Now turning to FIG. 1, a server configuration management system 100 is disclosed. In an embodiment, the server configuration management system 100 comprises a plurality of servers 102a-102m in a plurality of device groups 104a-104m, a plurality of configuration management agents 106a-106m executing on the plurality of servers 102a-102m, a script database 112, a configuration management server 122, and a network 132. In some contexts herein, the plurality of servers 102a-102m, the plurality of device groups 104a-104m, and the plurality of configuration management agents 106a-106m may be referred to as the servers 102, the device groups 104, and the agents 106, respectively.

The servers 102 may include non-production servers 102a-102f in a non-production environment 108 and production servers 102h-102m in a production environment 110. The non-production environment 108 may comprise development and test servers. In an embodiment, servers are grouped together into device groups 104 based on one or more common attributes. Such common attributes may include one or more of a common operating system platform (e.g., Advanced Interactive eXecutive (AIX), Sun, Hewlett Packard Unix (HP-UX), Linux, Wintel, etc.), a common environment (e.g., production, non-production, etc.), or a common customer (e.g., customer information system (CIS), government, etc.). For example, servers with a common operating system platform in a common environment may be grouped together into a common device group. Each of the servers 102 may comprise one of the agents 106 to automatically execute scripts locally without user interaction. The servers 102 may be implemented as computer systems. Computer systems are described further hereinafter.

In an embodiment, the script database 112 stores a plurality of audit policies. Each audit policy 114 comprises an audit script 116, a remediate script 118, and a list of target servers 120. Each audit policy 114 may correspond to one of the device groups 104. The audit policy 114 may be created and/or updated based on one or more vulnerability scans. For example, the audit script 116, when executed by one of the agents 106 on one of the servers 102, may check for a vulnerability identified in the one more vulnerability scans and the remediate script 118, when executed by an agent 106 on a non-compliant server, may fix the vulnerability if the vulnerability exists. The one or more vulnerability scans from which the audit policy 114 is generated may utilize a comprehensive vulnerability scanner to identify security vulnerabilities of servers in an enterprise network based on a database of known flaws. In an embodiment, the audit policy 114 is updated at least weekly based on a current vulnerability scan.

The audit script 116, when executed by one of the agents 106 on one of the servers 102, may check the configuration of the server 102. For example, the audit script 116 may check the configuration of the server 102 to determine whether the server 102 is in compliance with one or more of a security policy, an enterprise policy, a customer policy, or industry computer standards (e.g., SOX, PCI, etc.). If the server 102 is not in compliance, the remediate script 118, when executed, may remediate the non-compliant server so that the non-compliant server becomes compliant with the one or more of the security policy, the enterprise policy, the customer policy, or the industry computer standards.

The configuration management server 122 may be communicatively coupled via a network 132 to each of the agents 106 on the servers 102 and to the script database 112. The network 132 comprises one or more private networks, one or more public networks, or a combination thereof. The network 132 promotes communication as desired among the several components 102, 106, 112, and/or 122.

The configuration management server 122 may comprise one or more components to perform the functions discussed below. For example, the configuration management server 122 may comprise one or more of a server automation component 124, an operations orchestration component 126, and a service manager component 128. In an embodiment, the server automation component 124 enables communication between the configuration management server 122 and the agents 106, the operations orchestration component 126 automates the functions of the configuration management server 122, and the service manager component 128 opens change requests and tasks for each audit and each remediation. While illustrated as three different components in FIG. 1, the server automation component 124, the operations orchestration component 126, and the service manager component 128 may be combined into a single component or another number of components without departing from the spirit or scope of the present disclosure. The configuration management server 122 may also comprise a user interface 130 to aid in the creation of an exception. The configuration management server 122 may be implemented as a computer system. Computer systems are described further hereinafter.

In an embodiment, the configuration management server 122 applies the audit policy 114 to one or more non-production servers in the non-production environment 108 for a predetermined amount of time first to try to minimize audit policy problems in the production environment. For example, the configuration management 122 may apply the audit policy 114 to one or more non-production servers in the non-production environment 108 for at least one week, for at least two weeks, for at least three weeks, or for some other predetermined amount of time before implementing the audit policy 114 in the production environment 110. The configuration management server 122 may send the audit script 116 of the audit policy 114 from the script database 112 to a plurality of agents 106 executing on a plurality of non-production servers of a common device group (i.e., one of the device groups 104) in the non-production environment 108 based on the list of target servers 120 in the audit policy 114. For example, the configuration management server 122 may send the audit script 116 of the audit policy 114 to each agent 106a executing on each non-production server 102a of the device group 104a in the non-production environment 108 based on the list of target servers 120 in the audit policy 114. In an embodiment, the audit policy 114 is specific to the device group 104a. For instance, there may be different audit policies 114 for each of the device groups 104.

In an embodiment, each agent 106a automatically executes the audit script 116 locally on the non-production server 102a without user interaction. The audit script 116 may be executed at least weekly by each agent 106a. In an embodiment, the configuration management server 122 receives the audit results of the execution of the audit script 116 from each agent 106a. The audit results may identify at least some non-production servers of the device group 104a as being non-compliant non-production servers in need of remediation. In an embodiment, a non-compliant server is a server that comprises a vulnerability identified based on execution of the audit script 116. In an embodiment, each agent 106a in the device group 104a determines whether the non-production server 102a is compliant based on execution of the audit script 116, and this determination is conveyed in the audit results. Alternatively, the configuration management server 122 may determine whether each non-production server 102a is compliant based on the audit results received from each agent 106a. In an embodiment, each agent 106a executes the audit script 116 at least two times on at least two different days and the determination about which non-production servers are non-compliant is made after the audit script 116 is executed the at least two times. If the audit script 116 is executed two times by each agent 106a, the determination about which non-production servers are non-compliant may be based only on the audit results from the second execution of the audit script 116 or may be based on a combination of the audit results from the first and second execution of the audit script 116.

In an embodiment, the configuration management server 122 sends the remediate script 118 of the audit policy 114 from the script database 112 to corresponding agents 106 executing on the non-compliant non-production servers. Each of the corresponding agents 106 automatically executes the remediate script 118 locally on the non-compliant non-production server without user interaction. In an embodiment, execution of the remediate script 118 by a corresponding agent 106 may automatically enable or disable a service on a non-compliant server, automatically change a system configuration setting of the non-compliant server, automatically install a patch, and/or automatically update a version of software on the non-compliant server. Execution of the remediate script 118 by each of the non-compliant non-production servers of the common device group may maintain security, compliance with industry computer standards (e.g., SOX compliance, PCI compliance, etc.), and/or consistency among all of the servers of the common device group.

In some embodiments, execution of the remediate script 118 by the corresponding agent 106 may initiate a reboot. In such embodiments, in order to ensure a graceful shutdown/startup such that a load balancer recognizes when the server and any corresponding applications are present and able to receive traffic, executing the remediate script 118 comprises executing a stop script to stop an application on the non-compliant non-production server, rebooting the non-compliant non-production server, and executing a start script to start the application on the non-compliant non-production server. Execution of the stop script may prevent a load balancer from recognizing the application as being present and sending traffic to the application, and execution of the start script may enable the load balancer to recognize the application as being present and send traffic to the application.

In an embodiment, the configuration management server 122 receives remediate results of the execution of the remediate script 118 from the corresponding agents 106 executing on the non-compliant non-production servers. Each agent 106 on each non-compliant non-production server may rerun the audit script 116 after execution of the remediate script 118 to confirm that each non-compliant non-production server has been remediated. In an embodiment, the configuration management server 122 provides a notification to a plurality of computers. The notification may comprise at least one of the audit results from execution of the audit script 116 on the non-production servers or the remediate results from execution of the remediate script 118 on the non-production servers.

Responsive to a non-production server of the non-compliant non-production servers malfunctioning as a result of execution of the remediate script 118, the configuration management server 122 may create, via the user interface 130, and implement an exception for a production server in the common device group in the production environment 110 that corresponds to the non-production server of the common device group in the non-production environment 108. For example, if device group 104a in non-production environment 108 corresponds to device group 104h in production environment 110 (e.g., all servers in device group 104a and 104h have the same operating system platform) and non-production server 102a corresponds to one of the production servers in the device group 104h (e.g., supports similar services, similar functions performed, etc.), the configuration management server 122 may create, via the user interface 130, and implement an exception for that particular production server in the production environment 110. In an embodiment, a user, such as an information technology worker, a system administrator, a technician, an engineer, or another worker, may employ the user interface 130 to input information about the exception. The user interface 130 may be a web portal to the configuration management server 122, a console or terminal coupled to the configuration management server 122. Alternatively, the user interface 130 may send a data message to configuration management server 122 that comprises a command and information to promote the creation by the configuration management server 122 of the exception.

An agent 106 on the exception production server executes a modified audit policy based on the created exception such that the agent 106 on the exception production server does not apply at least a portion of the remediate script 118 to the exception production server, thereby minimizing audit policy issues in the production environment and helping to ensure that the exception production server will continue normal functioning in the production environment. The modified audit policy may comprise at least a portion of the audit script 116. In an embodiment, the modified audit policy comprises a portion of the remediate script 118. In an alternative embodiment, the modified audit policy does not comprise any of the remediate script 118. Any exception servers may be placed in one or more exception device groups.

In addition to the configuration management server 122 creating, via the user interface 130, an exception for the corresponding production server in the production environment 110, the configuration management server 122 may create, via the user interface 130, an exception for the non-production server that malfunctioned as a result of execution of the remediate script 118. In such an embodiment, an agent 106 on the exception non-production server may execute a modified audit policy such that the agent 106 on the exception non-production server does not apply at least a portion of the remediate script 118 to the exception non-production server.

After a predetermined amount of time, the configuration management server 122 may send the audit script 116 to a plurality of agents 106 executing on a plurality of production servers of the common device group in the production environment 110 based on a list of target servers in a production audit policy. For example, if device group 104a in non-production environment 108 corresponds to device group 104h in production environment 110 (e.g., all servers in device group 104a and 104h have the same operating system platform), the configuration management server 122 may send the audit script 116 to each agent 106h executing on each production server 102h of the device group 104h in the production environment 110 based on a list of target servers 120 in a production audit policy after a predetermined amount of time. In an embodiment, the predetermined amount of time is at least one week, at least two weeks, at least three weeks, or another amount of time. Alternatively, the predetermined amount of time may be based on a number of runs in the non-production environment 108. For example, after the audit policy 114 is run in the non-production environment at least two times, at least four times, or another amount of times, the audit policy 114 may be implemented in the production environment 110.

In an embodiment, each agent 106h automatically executes the audit script 116 locally on the production server 102h without user interaction. The audit script 116 may be executed at least weekly by each agent 106h. In an embodiment, the configuration management server 122 receives the audit results of the execution of the audit script 116 from each agent 106h. The audit results may identify at least some production servers of the device group 104h as being non-compliant production servers in need of remediation. In an embodiment, each agent 106h in the device group 104h determines whether the production server 102h is compliant based on execution of the audit script 116, and this determination is conveyed in the audit results. Alternatively, the configuration management server 122 may determine whether each production server 102h is compliant based on the audit results received from each agent 106h. In an embodiment, each agent 106h executes the audit script 116 at least two times on at least two different days, and the determination about which production servers are non-compliant is made after the audit script 116 is executed the at least two times. If the audit script 116 is executed two times by each agent 106h, the determination about which production servers are non-compliant may be based only on the audit results from the second execution of the audit script 116 or may be based on a combination of the audit results from the first and second execution of the audit script 116.

In an embodiment, the configuration management server 122 sends the remediate script 118 of the production audit policy from the script database 112 to corresponding agents 106 executing on the non-compliant production servers. Each of the corresponding agents automatically executes the remediate script 118 locally on the non-compliant production server without user interaction. In an embodiment, execution of the remediate script 118 by a corresponding agent 106 may enable or disable a service on a non-compliant server, change a system configuration setting of the non-compliant server, install a patch, and/or update a version of software on the non-compliant server. Execution of the remediate script 118 by each of the non-compliant production servers of the common device group may maintain security, compliance with industry computer standards (e.g., SOX compliance, PCI compliance, etc.), and/or consistency among all of the servers of the common device group.

In some embodiments, execution of the remediate script 118 by the corresponding agent 106 may initiate a reboot. In such embodiments, in order to ensure a graceful shutdown/startup such that a load balancer recognizes when the server and any corresponding applications are present and able to receive traffic, executing the remediate script 118 comprises executing a stop script to stop an application on the non-compliant production server, rebooting the non-compliant production server, and executing a start script to start the application on the non-compliant production server. Execution of the stop script may prevent a load balancer from recognizing the application as being present and sending traffic to the application and execution of the start script may enable the load balancer to recognize the application as being present and send traffic to the application.

In an embodiment, the configuration management server 122 receives remediate results of the execution of the remediate script 118 from the corresponding agents 106 executing on the non-compliant production servers. Each agent 106 on each non-compliant production server may rerun the audit script 116 after execution of the remediate script 118 to confirm that each non-compliant production server has been remediated. In an embodiment, the configuration management server 122 provides a notification to a plurality of computers. For example, the configuration management server 122 may provide the notification to a plurality of administrator computers. The notification may comprise at least one of the audit results from execution of the audit script 116 on the production servers or the remediate results from execution of the remediate script 118 on the production servers.

Figure 2:
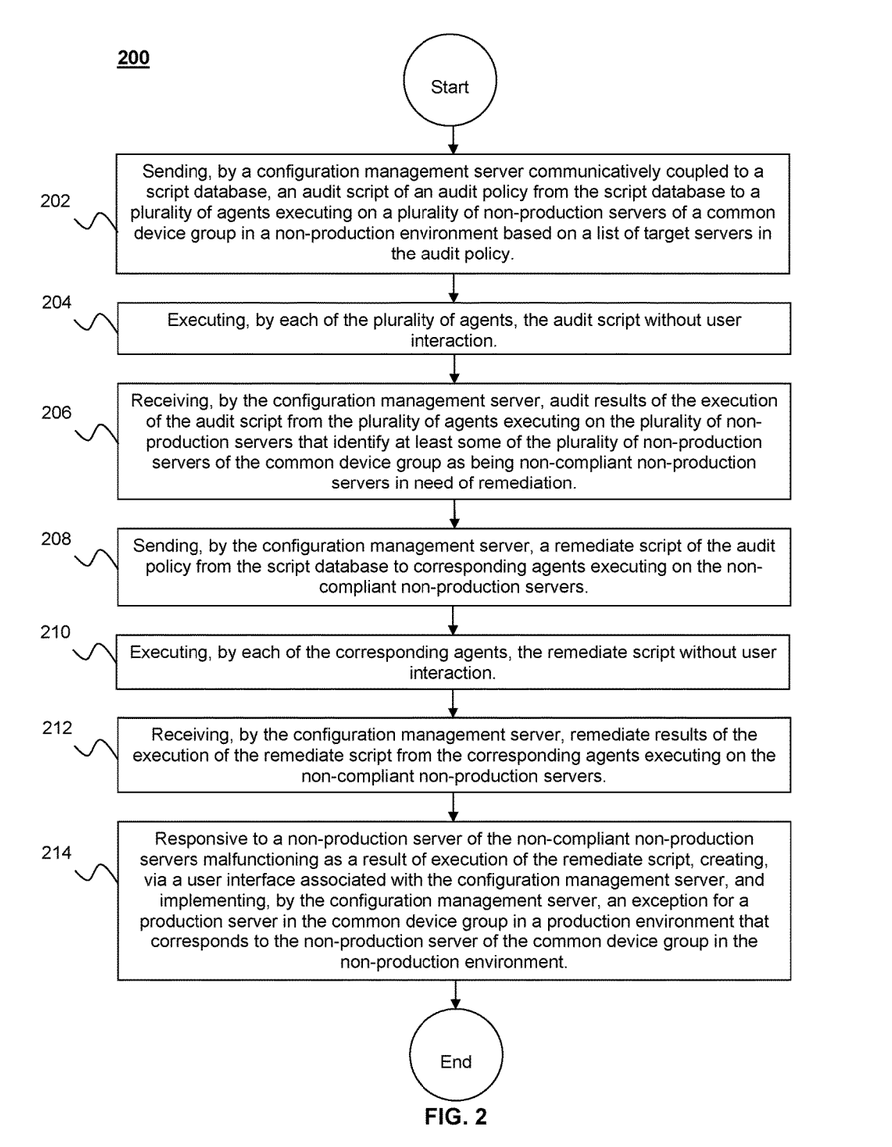
FIG. 2 is a flow chart of a method according to an embodiment of the disclosure.

Now turning to FIG. 2, a server configuration management method 200 is described. At block 202, the configuration management server 122 sends an audit script 116 of an audit policy 114 from the script database 112 to a plurality of agents 106a executing on a plurality of non-production servers 102a of a common device group 104a in a non-production environment 108 based on a list of target servers 120 in the audit policy 114. The audit policy 114 may be for the common device group 104a of the plurality of device groups 104. At block 204, each of the plurality of agents 106a executes the audit script 116 without user interaction.

At block 206, the configuration management server 122 receives audit results of the execution of the audit script 116 from the plurality of agents 106a executing on the plurality of non-production servers 102a that identify at least some of the plurality of non-production servers 102a of the common device group 104a as being non-compliant non-production servers in need of remediation. At block 208, the configuration management server 122 sends a remediate script 118 of the audit policy 114 from the script database 112 to corresponding agents 106 executing on the non-compliant non-production servers. At block 210, each of the corresponding agents 106 executes the remediate script 118 without user interaction.

At block 212, the configuration management server 122 receives remediate results of the execution of the remediate script 118 from the corresponding agents 106 executing on the non-compliant non-production servers. At block 214, responsive to a non-production server of the non-compliant non-production servers malfunctioning as a result of execution of the remediate script 118, the configuration management server 122 creates, via a user interface 130, and implements an exception for a production server 102h in the common device group 104h in a production environment 110 that corresponds to the non-production server 102a of the common device group 104a in the non-production environment 108. An agent 106h on the exception production server 102h may execute a modified audit policy based on the exception such that the agent 106h on the exception production server 102h does not apply at least a portion of the remediate script 118 to the exception production server 102h.

Figure 3:
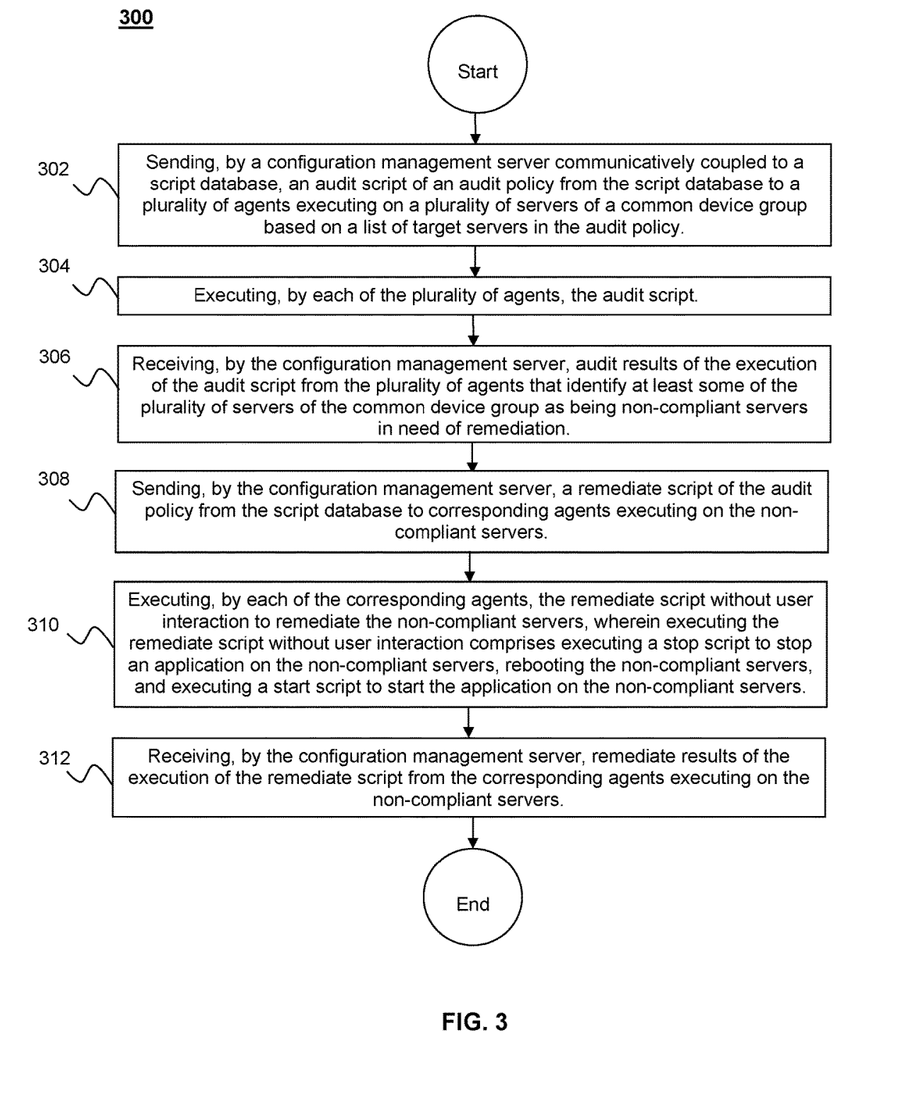
FIG. 3 is a flow chart of a method according to an embodiment of the disclosure.

Now turning to FIG. 3, a server configuration management method 300 is described. At block 302, the configuration management server 122 sends an audit script 116 of an audit policy 114 from the script database 112 to a plurality of agents 106 executing on a plurality of servers of a common device group based on a list of target servers 120 in the audit policy 114. The audit policy 114 may be for the common device group of the plurality of device groups 104. The plurality of servers may be non-production servers or production servers. At block 304, each of the plurality of agents 106 executes the audit script 116.

At block 306, the configuration management server 122 receives audit results of the execution of the audit script 116 from the plurality of agents 106 that identify at least some of the plurality of servers of the common device group as being non-compliant servers in need of remediation. At block 308, the configuration management server 122 sends a remediate script 118 of the audit policy 114 from the script database 112 to corresponding agents 106 executing on the non-compliant servers.

At block 310, each of the corresponding agents 106 executes the remediate script 118 without user interaction to remediate the non-compliant servers. In an embodiment, executing the remediate script 118 without user interaction comprises executing a stop script to stop an application on the non-compliant servers, rebooting the non-compliant servers, and executing a start script to start the application on the non-compliant servers. At block 312, the configuration management server 122 receives remediate results of the execution of the remediate script 118 from the corresponding agents executing on the non-compliant servers.

Figure 4:
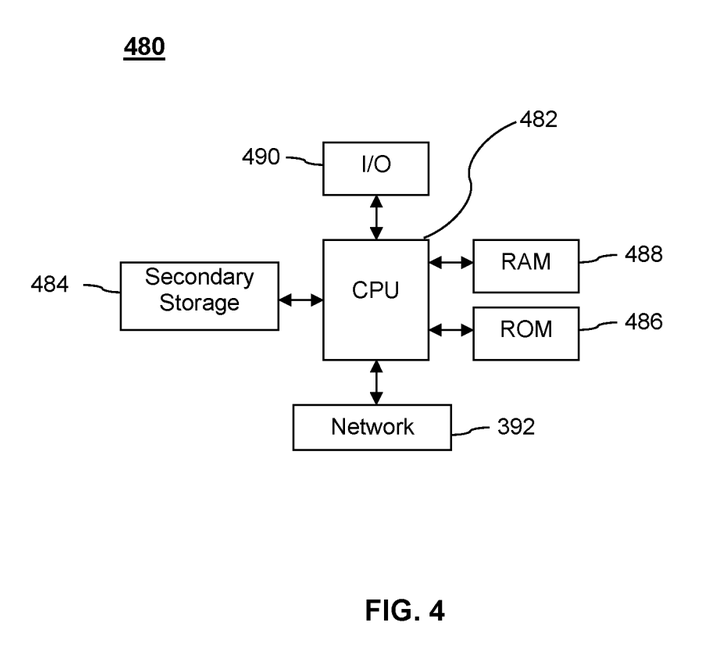
FIG. 4 illustrates an exemplary computer system suitable for implementing the several embodiments of the disclosure.

FIG. 4 illustrates a computer system 480 suitable for implementing one or more embodiments disclosed herein. For example, the computer system 480 may be used to implement any of the network components and/or elements, including a server. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor 482 may be implemented as one or more CPU chips.

It is understood that by programming and/or loading executable instructions onto the computer system 480, at least one of the CPU 482, the RAM 488, and the ROM 486 are changed, transforming the computer system 480 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementations in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 480 is turned on or booted, the CPU 482 may execute a computer program or application. For example, the CPU 482 may execute software or firmware stored in the ROM 486 or stored in the RAM 488. In some cases, on boot and/or when the application is initiated, the CPU 482 may copy the application or portions of the application from the secondary storage 484 to the RAM 488 or to memory space within the CPU 482 itself, and the CPU 482 may then execute instructions that the application is comprised of. In some cases, the CPU 482 may copy the application or portions of the application from memory accessed via the network connectivity devices 492 or via the I/O devices 490 to the RAM 488 or to memory space within the CPU 482, and the CPU 482 may then execute instructions that the application is comprised of. During execution, an application may load instructions into the CPU 482, for example load some of the instructions of the application into a cache of the CPU 482. In some contexts, an application that is executed may be said to configure the CPU 482 to do something, e.g., to configure the CPU 482 to perform the function or functions promoted by the subject application. When the CPU 482 is configured in this way by the application, the CPU 482 becomes a specific purpose computer, which is a non-generic, particular machine and/or a specific purpose machine.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage 484. The RAM 488 is used to store volatile data and perhaps to store instructions. Access to both ROM 486 and RAM 488 is typically faster than to secondary storage 484. The secondary storage 484, the RAM 488, and/or the ROM 486 may be referred to in some contexts as computer readable storage media and/or non-transitory computer readable media.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, routers, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 492 may enable the processor 482 to communicate with the Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 482 executes, and is configured by, instructions, codes, computer programs, scripts which it accesses from hard disk, optical disk (these various disk based systems may all be considered secondary storage 484), flash drive, ROM 486, RAM 488, or the network connectivity devices 492. While only one processor 482 is shown, it is understood that any number of processors may be present and each processor may include one or more cores. Thus, while instructions may be discussed as executed by a processor, the instructions may be executed simultaneously, serially, or otherwise executed by one or multiple processors and/or cores therein through the use of threads. Instructions, codes, computer programs, scripts, and/or data that may be accessed from the secondary storage 484, for example, hard drives, floppy disks, optical disks, and/or other device, the ROM 486, and/or the RAM 488 may be referred to in some contexts as non-transitory instructions and/or non-transitory information.

In an embodiment, the computer system 480 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software (e.g., a hypervisor) may be employed by the computer system 480 to provide the functionality of a number of servers that is not directly bound to the number of physical computers in the computer system 480. For example, virtualization software may provide twenty virtual servers on four physical host computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided via a computer program product that configures particular machines. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 480, at least portions of the contents of the computer program product to the secondary storage 484, to the ROM 486, to the RAM 488, and/or to other non-volatile memory and volatile memory of the computer system 480. The processor 482 may process the executable instructions and/or data structures in part by directly accessing the computer program product, for example by reading from a CD-ROM disk inserted into a disk drive peripheral of the computer system 480. Alternatively, the processor 482 may process the executable instructions and/or data structures by remotely accessing the computer program product, for example by downloading the executable instructions and/or data structures from a remote server through the network connectivity devices 492. The computer program product may comprise instructions that promote the loading and/or copying of data, data structures, files, and/or executable instructions to the secondary storage 484, to the ROM 486, to the RAM 488, and/or to other non-volatile memory and volatile memory of the computer system 480.

In some contexts, the secondary storage 484, the ROM 486, and the RAM 488 may be referred to as a non-transitory computer readable medium or a computer readable storage media. A dynamic RAM embodiment of the RAM 488, likewise, may be referred to as a non-transitory computer readable medium in that while the dynamic RAM receives electrical power and is operated in accordance with its design, for example during a period of time during which the computer system 480 is turned on and operational, the dynamic RAM stores information that is written to it. Similarly, the processor 482 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A server configuration management system, comprising:
    a script database storing a plurality of audit policies for a plurality of device groups, wherein the plurality of audit policies comprises a plurality of audit scripts, a plurality of remediate scripts, and lists of target servers;
    a plurality of servers comprising a plurality of non-production servers, wherein each of the plurality of servers is associated with one of the plurality of device groups and comprises an agent that executes at least a portion of one of the plurality of audit policies corresponding to the one of the plurality of device groups; and
    a configuration management server communicatively coupled to the script database and the agent on each of the plurality of servers, comprising:
        at least one non-transitory memory,
        at least one processor, and
        one or more components stored in the at least one non-transitory memory, that when executed by the at least one processor:
            send an audit script of an audit policy from the script database to a plurality of agents executing on the plurality of non-production servers of a common device group in a non-production environment based on a list of target servers in the audit policy, wherein the audit policy is for the common device group of the plurality of device groups,
            receive audit results of the execution of the audit script from the plurality of agents executing on the plurality of non-production servers that identify at least some of the plurality of non-production servers of the common device group as being non-compliant non-production servers in need of remediation,
            send a remediate script of the audit policy from the script database to corresponding agents executing on the non-compliant non-production servers,
            receive remediate results of the execution of the remediate script from the corresponding agents executing on the non-compliant non-production servers, and
            responsive to a non-production server of the non-compliant non-production servers malfunctioning as a result of execution of the remediate script, create, via a user interface, and implement an exception for a production server in the common device group in a production environment that corresponds to the non-production server of the common device group in the non-production environment, wherein an agent on the exception production server executes a modified audit policy based on the exception such that the agent on the exception production server does not apply at least a portion of the remediate script to the exception production server.

2. The server configuration management system of claim 1, wherein each of the audit policies is created based on one or more vulnerability scans.

3. The server configuration management system of claim 1, wherein each of the corresponding agents executing on the non-compliant non-production servers executes the remediate script without user interaction, and wherein execution of the remediate script at least one of disables a service on a non-compliant production server, changes a system configuration setting of the non-compliant production server, installs a patch, or updates a version of software on the non-compliant production server.

4. The server configuration management system of claim 1, wherein the modified audit policy comprises at least a portion of the audit script.

5. The server configuration management system of claim 1, wherein the plurality of servers further comprises a plurality of production servers, and wherein the configuration management server is further configured to:
after a predetermined amount of time, send the audit script to a plurality of agents executing on the plurality of production servers of the common device group in the production environment based on a list of target servers in a production audit policy,
receive audit results of the execution of the audit script from the plurality of agents executing on the plurality of production servers that identify at least some of the plurality of production servers of the common device group as being non-compliant production servers in need of remediation,
send the remediate script of the production audit policy from the script database to corresponding agents executing on the non-compliant production servers, and
receive remediate results of the execution of the remediate script from the corresponding agents executing on the non-compliant production servers.

6. The server configuration management system of claim 5, wherein each of the plurality of device groups is associated with a different operating system platform, and wherein the plurality of non-production servers and the plurality of production servers of the common device group comprise the same operating system platform.

7. The server configuration management system of claim 5, wherein the predetermined amount of time is two weeks.

8. The server configuration management system of 5, wherein each of the corresponding agents executing on the non-compliant non-production servers and each of the corresponding agents executing on the non-compliant production servers reruns the audit script after executing the remediate script.

9. The server configuration management system of claim 5, wherein each of the plurality of agents executing on the plurality of non-production servers and each of the plurality of agents executing on the plurality of production servers executes the audit script at least two times and the non-compliant non-production servers and the non-compliant production servers are identified after the audit script is executed the at least two times.

10. A server configuration management method, comprising:
sending, by a configuration management server communicatively coupled to a script database, an audit script of an audit policy from the script database to a plurality of agents executing on a plurality of non-production servers of a common device group in a non-production environment based on a list of target servers in the audit policy, wherein the audit policy is for the common device group of the plurality of device groups;
executing, by each of the plurality of agents, the audit script without user interaction;
receiving, by the configuration management server, audit results of the execution of the audit script from the plurality of agents executing on the plurality of non-production servers that identify at least some of the plurality of non-production servers of the common device group as being non-compliant non-production servers in need of remediation;
sending, by the configuration management server, a remediate script of the audit policy from the script database to corresponding agents executing on the non-compliant non-production servers;
executing, by each of the corresponding agents, the remediate script without user interaction;
receiving, by the configuration management server, remediate results of the execution of the remediate script from the corresponding agents executing on the non-compliant non-production servers; and
responsive to a non-production server of the non-compliant non-production servers malfunctioning as a result of execution of the remediate script, creating, via a user interface associated with the configuration management server, and implementing, by the configuration management server, an exception for a production server in the common device group in a production environment that corresponds to the non-production server of the common device group in the non-production environment, wherein an agent on the exception production server executes a modified audit policy based on the exception such that the agent on the exception production server does not apply at least a portion of the remediate script to the exception production server.

11. The server configuration management method of claim 10, wherein the non-production environment comprises development servers and test servers.

12. The server configuration management method of claim 10, further comprising updating the audit policy at least weekly based on a current vulnerability scan.

13. The server configuration management method of claim 10, wherein each of the plurality of agents executes the audit script at least weekly.

14. The server configuration management system of claim 10, wherein any exception production servers are placed in one or more exception device groups.

15. The server configuration management method of claim 10, further comprising creating, via the user interface associated with the configuration management server, an exception for the non-production server that malfunctioned as a result of execution of the remediate script, wherein an agent on the exception non-production server executes a modified audit policy such that the agent on the exception non-production server does not apply at least a portion of the remediate script to the exception non-production server.

16. The server configuration management method of claim 10, wherein executing the remediate script without user interaction comprises executing a stop script to stop an application on the non-compliant non-production servers, rebooting the non-compliant non-production servers, and executing a start script to start the application on the non-compliant non-production servers.

17. A server configuration management method, comprising:
sending, by a configuration management server communicatively coupled to a script database, an audit script of an audit policy from the script database to a plurality of agents executing on a plurality of servers of a common device group based on a list of target servers in the audit policy, wherein the audit policy is for the common device group of the plurality of device groups;
executing, by each of the plurality of agents, the audit script;
receiving, by the configuration management server, audit results of the execution of the audit script from the plurality of agents that identify at least some of the plurality of servers of the common device group as being non-compliant servers in need of remediation;

sending, by the configuration management server, a remediate script of the audit policy from the script database to corresponding agents executing on the non-compliant servers;

executing, by each of the corresponding agents, the remediate script without user interaction to remediate the non-compliant servers, wherein executing the remediate script without user interaction comprises executing a stop script to stop an application on the non-compliant servers, rebooting the non-compliant servers, and executing a start script to start the application on the non-compliant servers; and receiving, by the configuration management server, remediate results of the execution of the remediate script from the corresponding agents executing on the non-compliant servers.

18. The method of claim 17, wherein execution of the stop script by each of the corresponding agents prevents a load balancer from recognizing the application as being present and sending traffic to the application, and wherein execution of the start script enables the load balancer to recognize the application as being present and send traffic to the application.

19. The method of claim 17, further comprising providing, by the configuration management server, a notification to a plurality of computers, wherein the notification comprises at least one of the audit results or the remediate results.

20. The method of claim 17, further comprising responsive to a non-production server of the non-compliant servers malfunctioning as a result of execution of the remediate script, creating, via a user interface associated with the configuration management server, an exception for a production server in the common device group in a production environment that corresponds to the non-production server of the common device group in a non-production environment, wherein an agent on the exception production server executes a modified audit policy such that the agent on the exception production server does not apply at least a portion of the remediate script to the exception production server.

* * * * *